Figure 44:
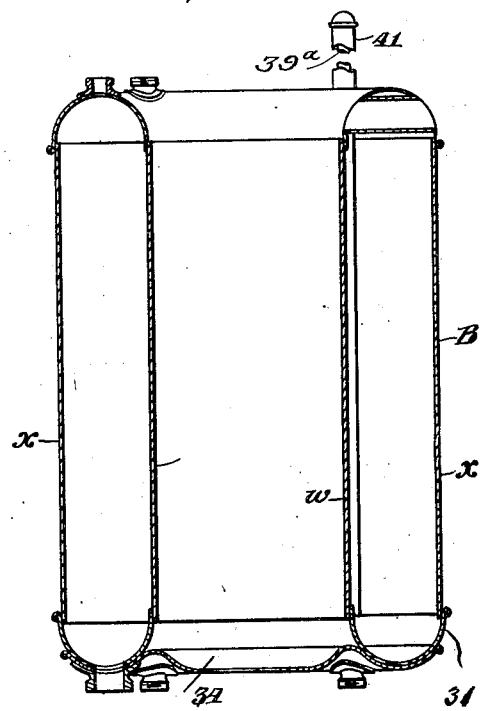

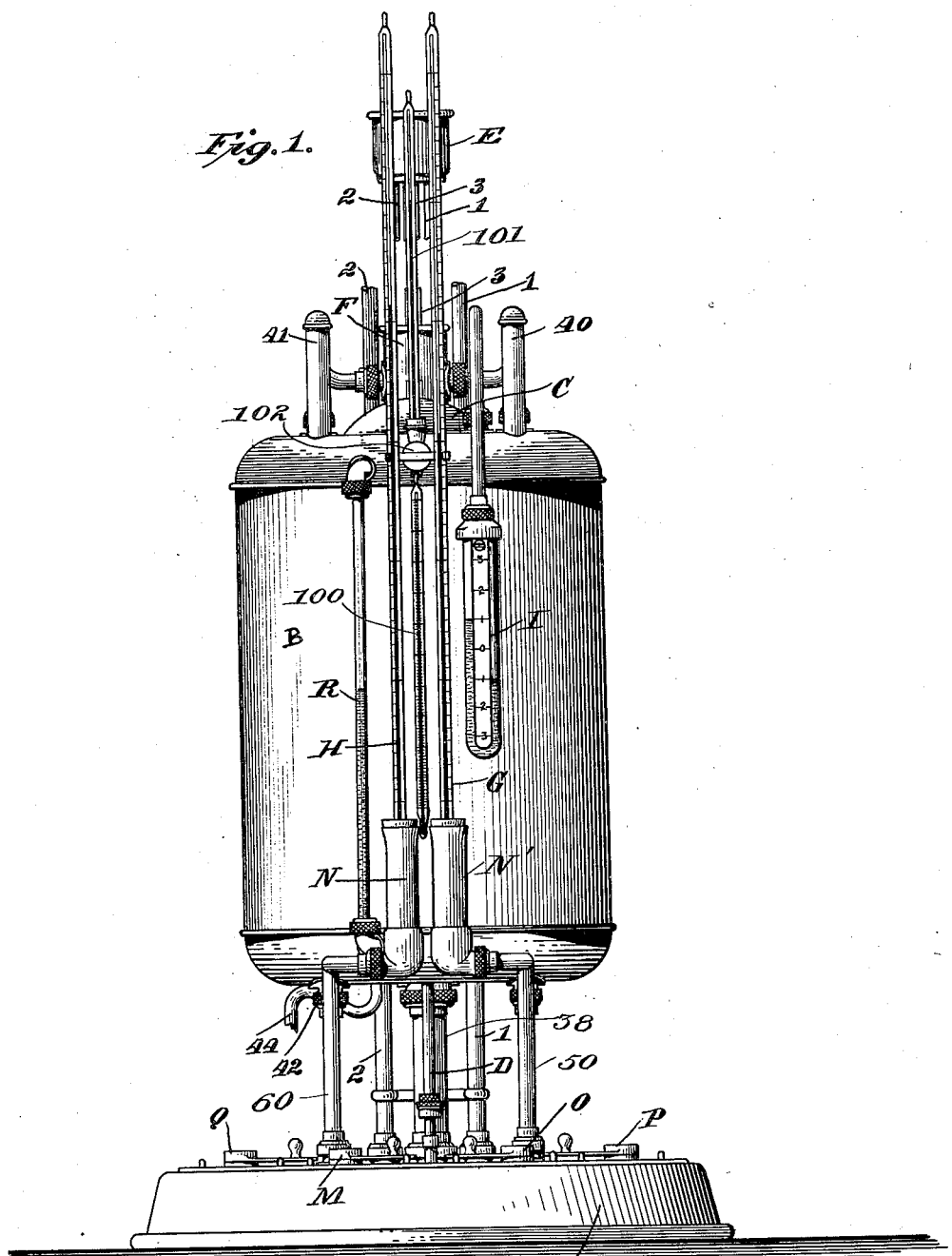

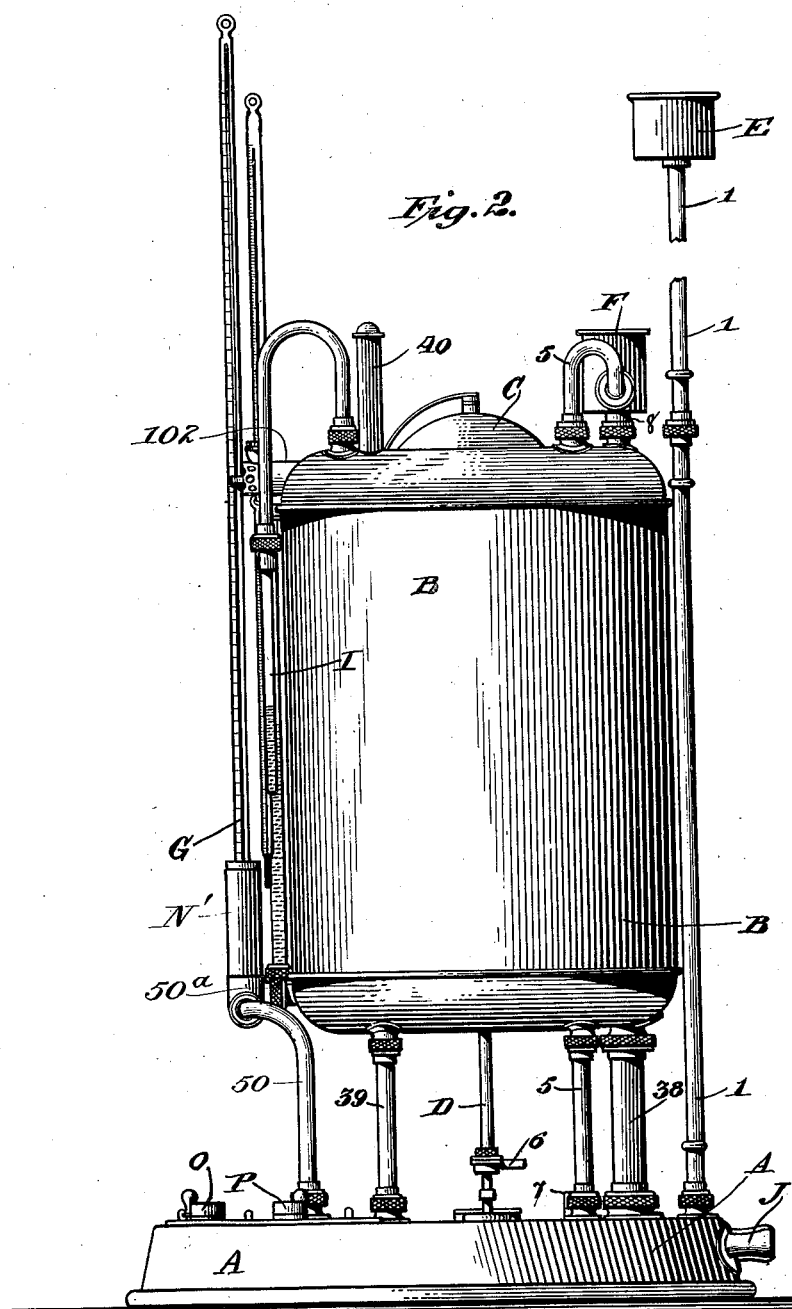

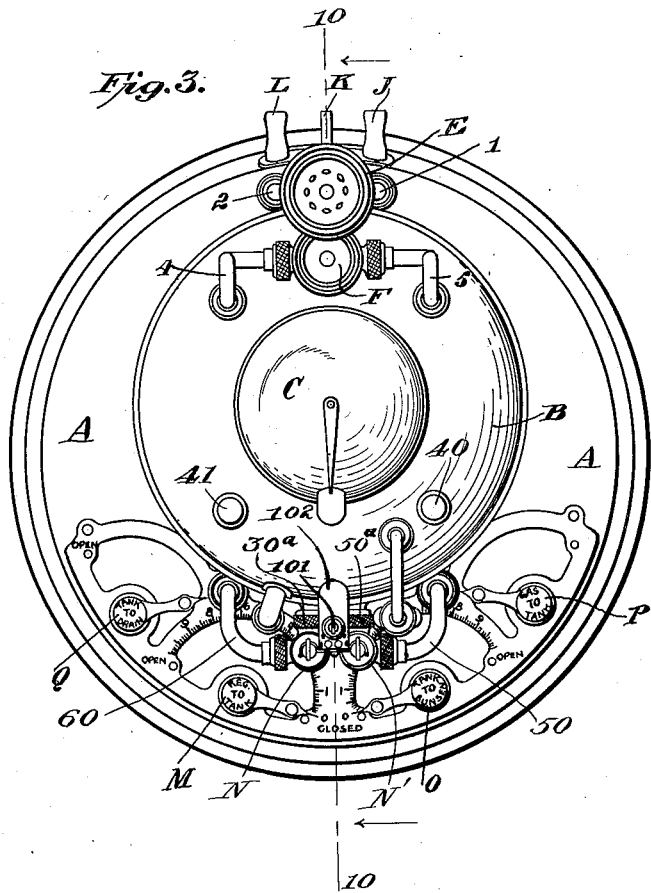

No. 828,306.
PATENTED AUG. 14, 1906.
H. L. DOHERTY.
GAS CALORIMETER.
APPLICATION FILED MAR. 15, 1905.
12 SHEETS—SHEET 4.
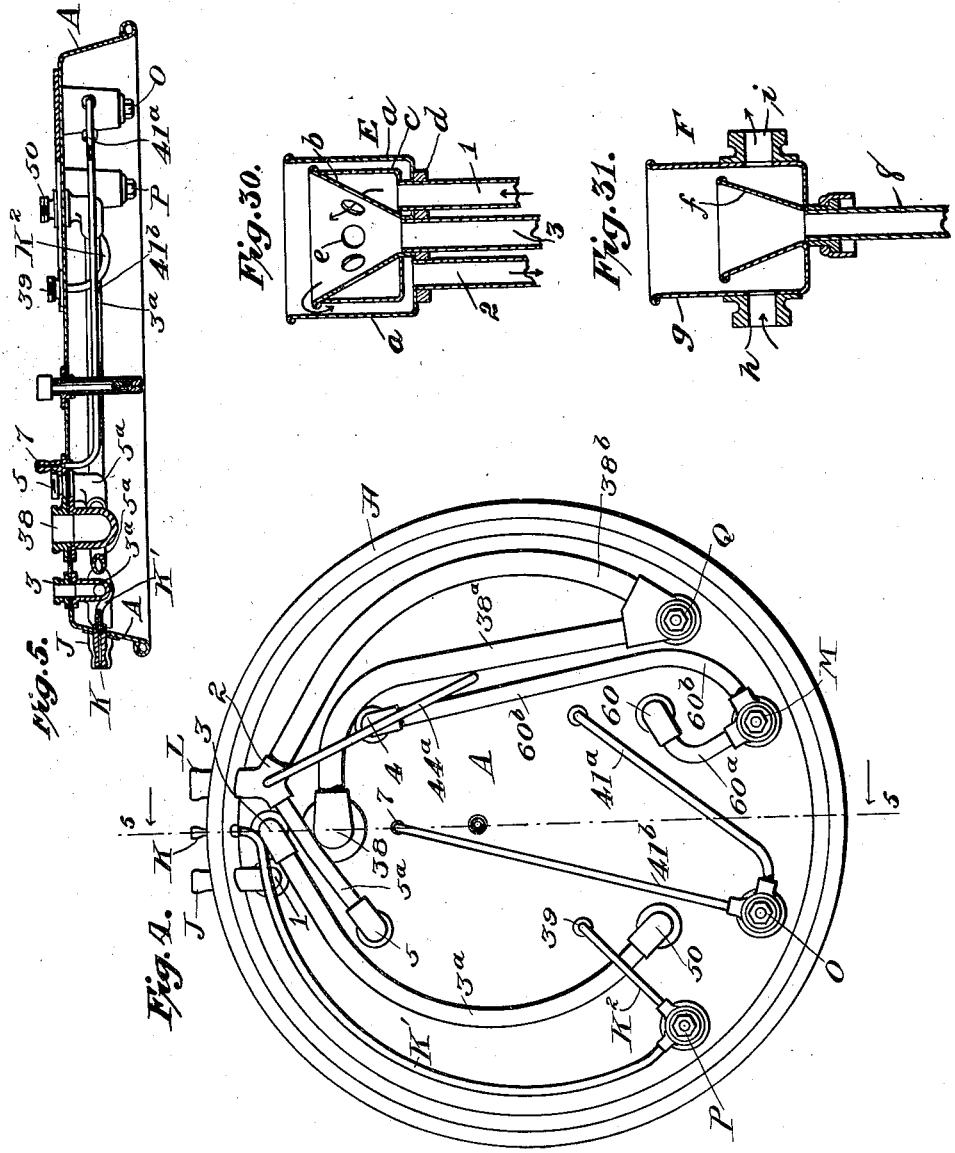
Attest:
Inventor:
Henry L. Doherty
by Dickerson, Brown, Raegener & Binney
Attys.

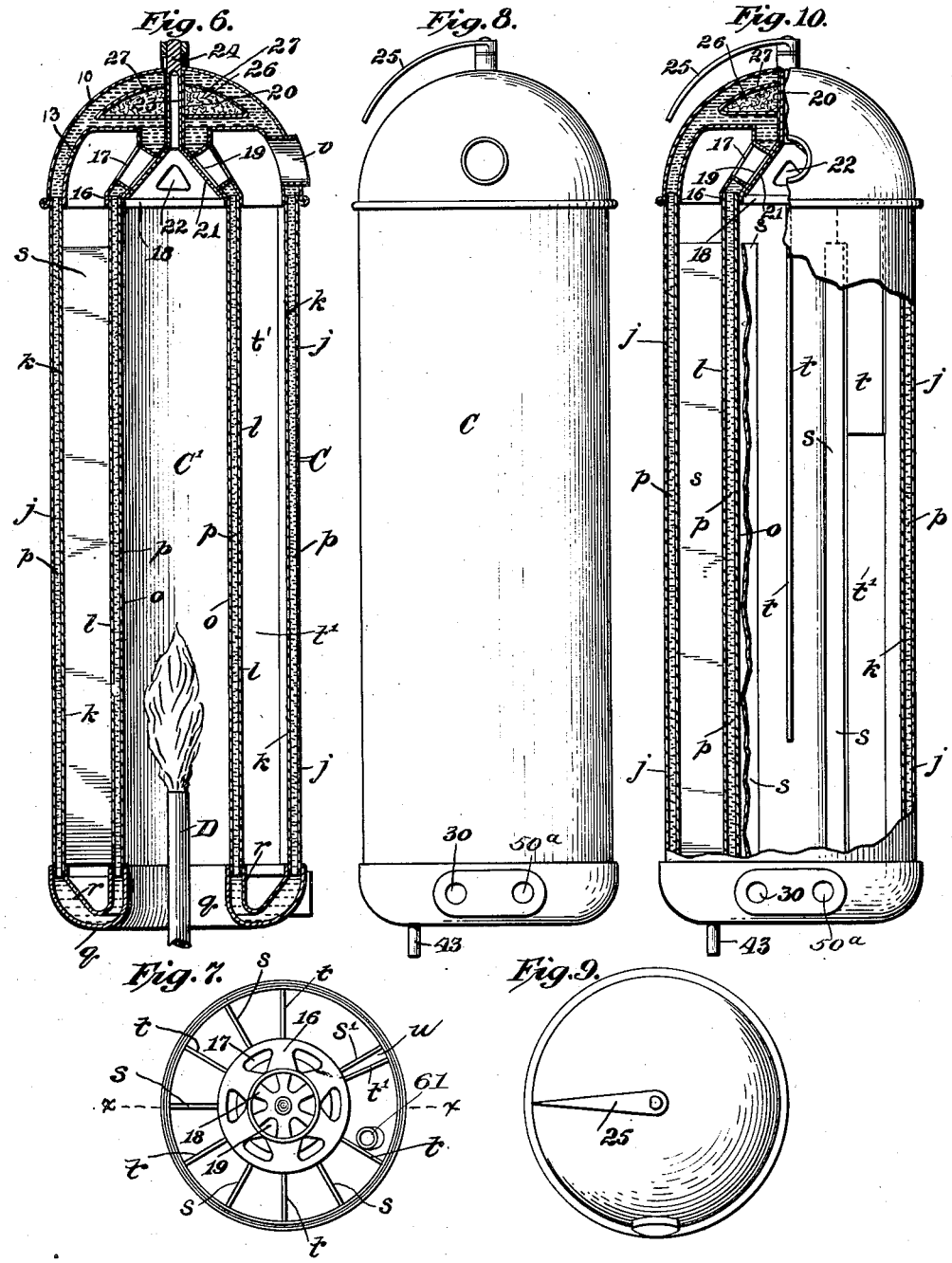

No. 828,306. PATENTED AUG. 14, 1906.
H. L. DOHERTY.
GAS CALORIMETER.
APPLICATION FILED MAR. 15, 1905.
12 SHEETS—SHEET 6.
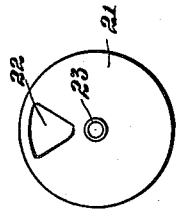
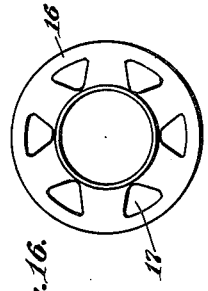
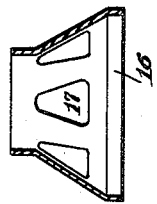
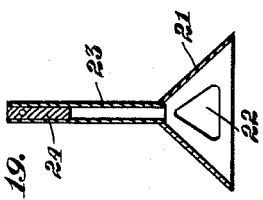
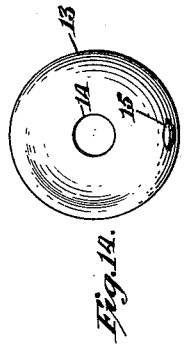
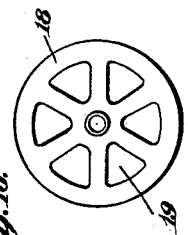
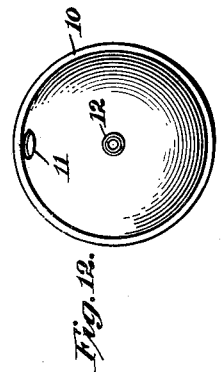
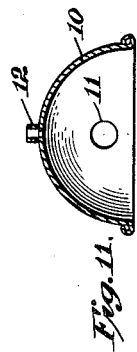
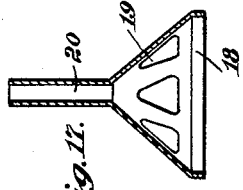
Attest:
N. C. Mitchell
A. L. O'Brien
Inventor:
Henry L. Doherty
by Dickerson, Brown, Raegener & Binney
Attys.

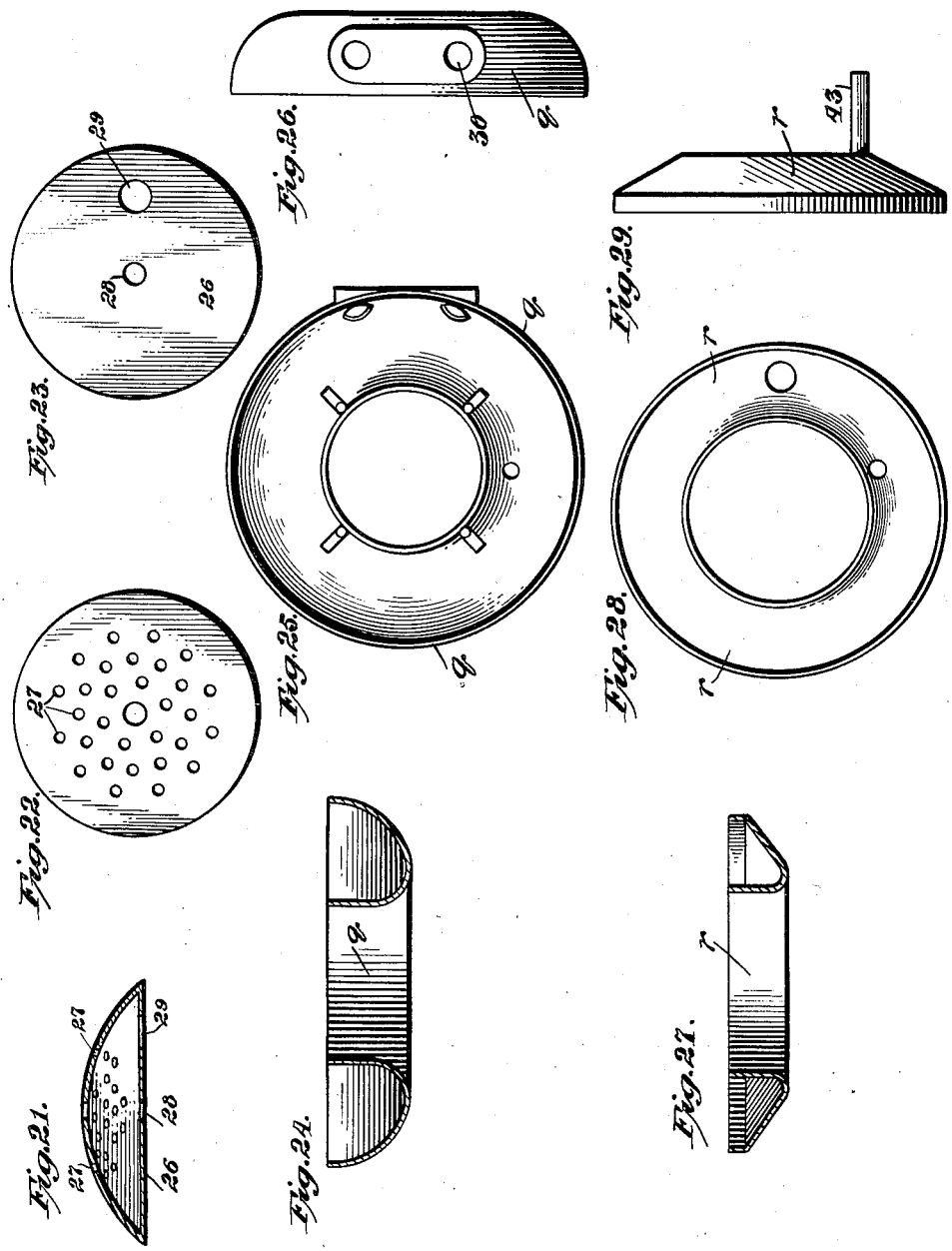

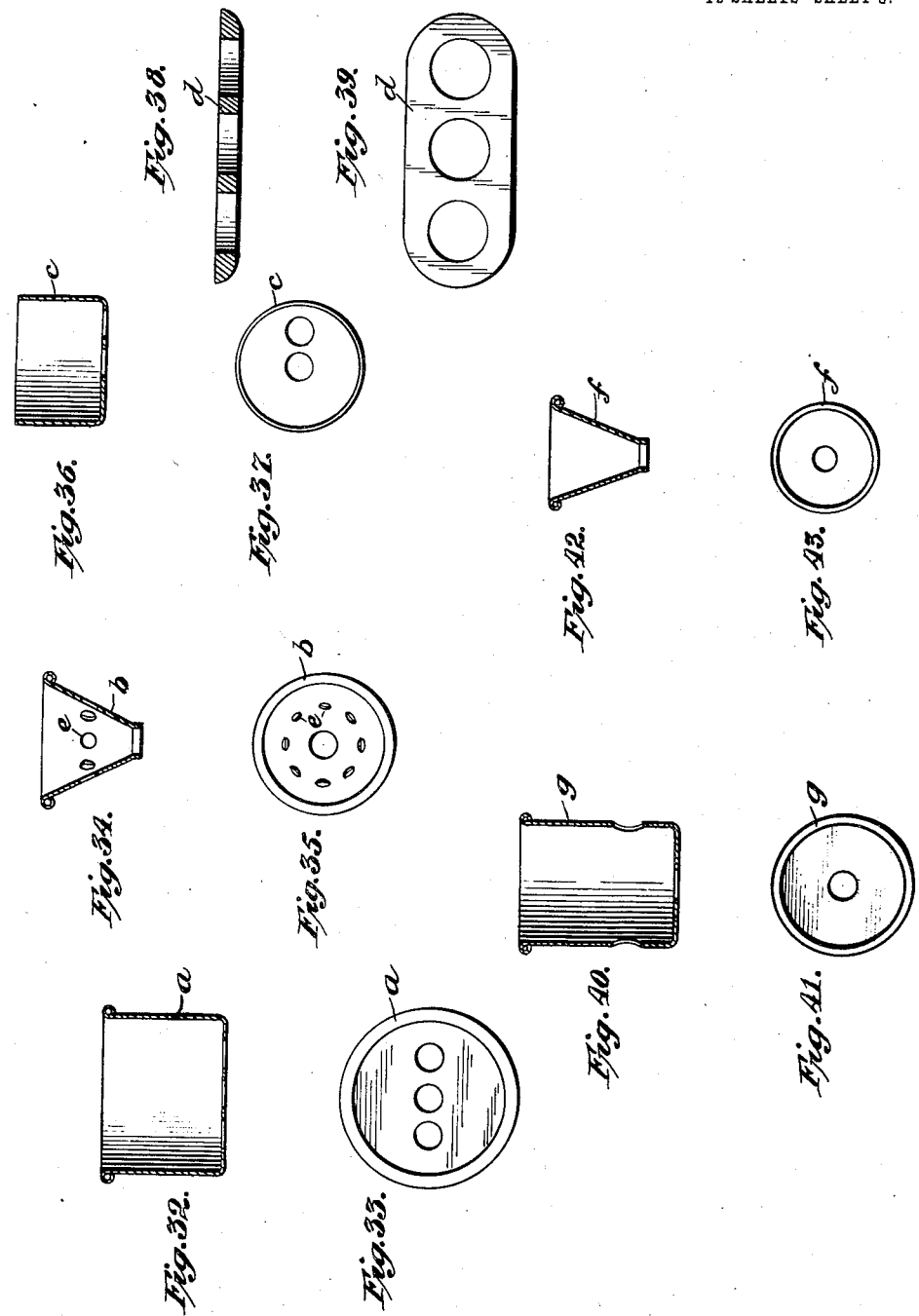

No. 828,306. PATENTED AUG. 14, 1906.
H. L. DOHERTY.
GAS CALORIMETER.
APPLICATION FILED MAR. 15, 1905.

12 SHEETS—SHEET 9.

Attest:
Bomitchell
A. L. O'Brien

Inventor:
Henry L. Doherty
by
Dickerson, Brown, Raegener & Binney
Attys.

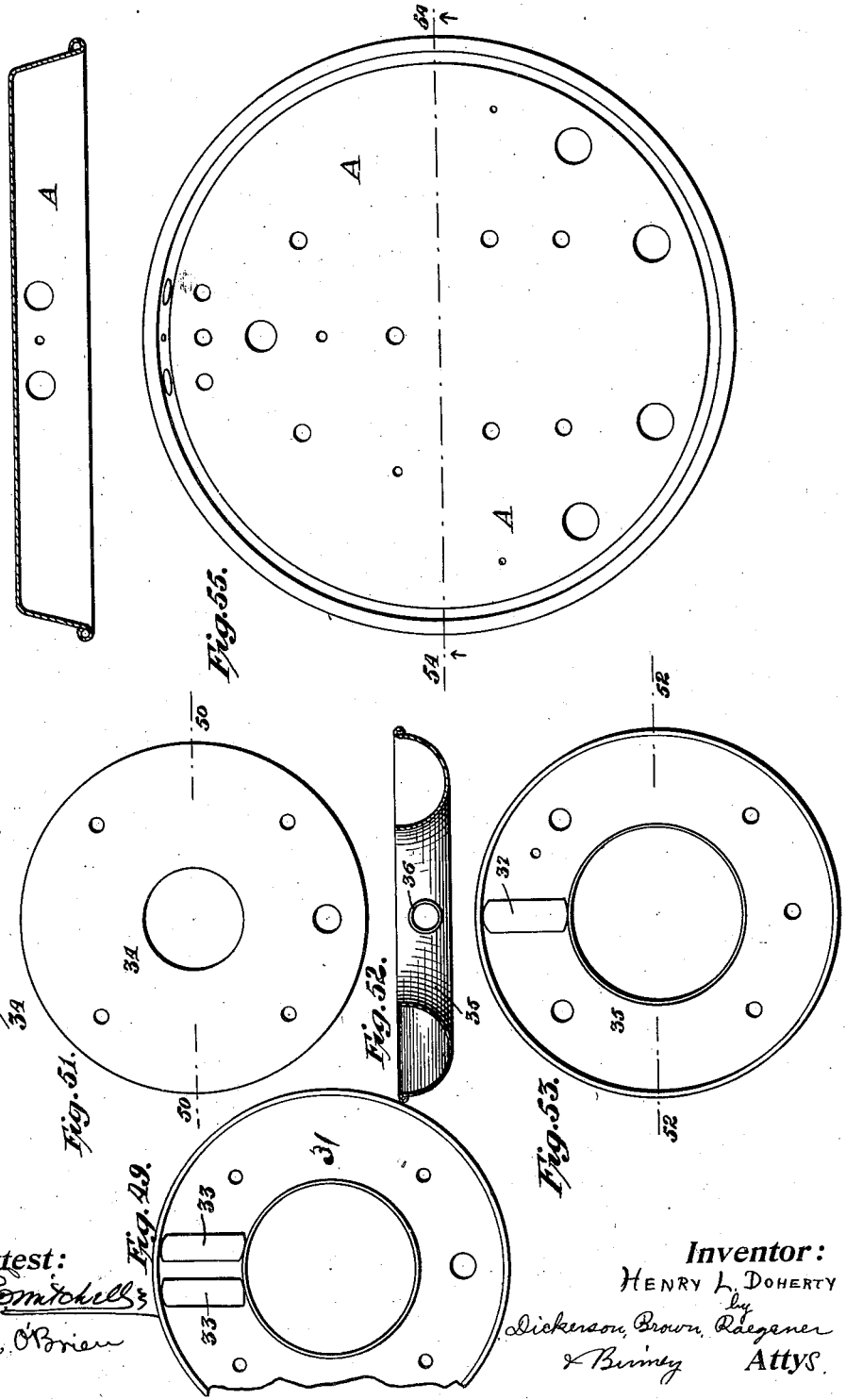

No. 828,306. PATENTED AUG. 14, 1906.
H. L. DOHERTY.
GAS CALORIMETER.
APPLICATION FILED MAR. 15, 1905.
12 SHEETS—SHEET 11.
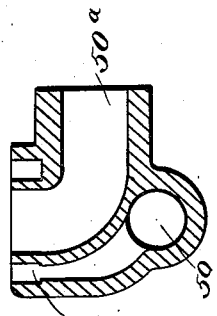
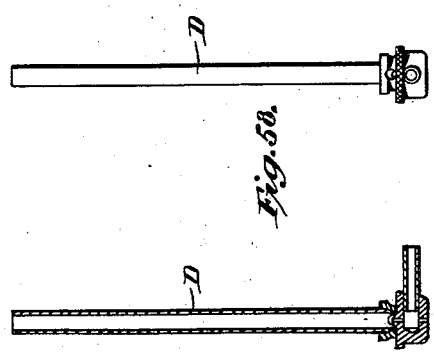
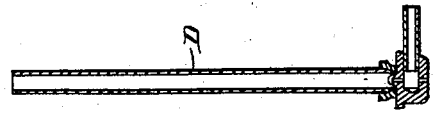
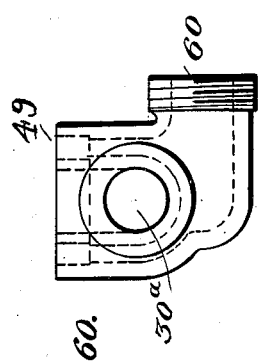
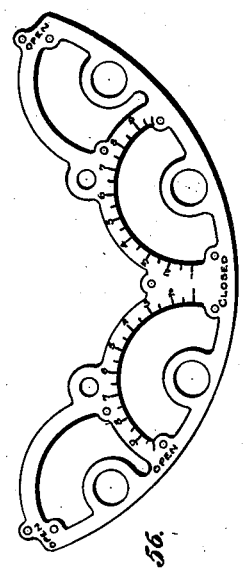
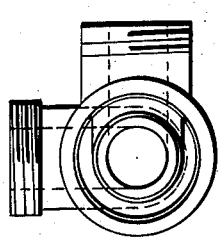
Attest:
E. Mitchell
A. L. O'Brien
Inventor:
Henry L. Doherty
by Dickerson, Brown, Raegener & Binney
Attys.

UNITED STATES PATENT OFFICE.

HENRY L. DOHERTY, OF MADISON, WISCONSIN, ASSIGNOR TO COMBUSTION UTILITIES COMPANY, A CORPORATION OF NEW YORK.

GAS-CALORIMETER.

No. 828,306.

Specification of Letters Patent.

Patented Aug. 14, 1906.

Application filed March 15, 1905. Serial No. 250,196.

*To all whom it may concern:*

Be it known that I, HENRY L. DOHERTY, a citizen of the United States, and a resident of Madison, Dane county, Wisconsin, have invented certain new and useful Improvements in Gas-Calorimeters, of which the following is a specification accompanied by drawings.

This invention relates to calorimeters such as are used to determine the calorific value of any combustible gas.

The object of the invention is to measure the calorific value of any combustible gas without requiring much time in making the test and but very little or no calculation on the part of the operator. The gas under test is completely burned in a Bunsen burner, and the entire quantity of heat liberated by this combustion is transmitted to or absorbed by water which is constantly kept flowing through a boiler, preferably called an "absorption-chamber." The temperature of the water before entering and after leaving the absorption-chamber is taken, and the water after leaving the absorption-chamber passes to a tank which contains the gas before it is burned. Thus the water displaces the gas volume for volume. Consequently for each cubic foot of gas burned there passes through the absorption-chamber a cubic foot of water, so that there is a constant ratio between the amount of gas burned and the amount of water passed through the absorption-chamber. As the difference in temperature of the water is taken before and after passing through the absorption-chamber, there is afforded a means for measuring the amount of heat generated by the burning of the gas—that is, the difference in reading of the inlet and outlet thermometers in degrees Fahrenheit multiplied by the coefficient of thermal capacity of a cubic foot of water gives the calorific value of a cubic foot of gas in British thermal units. The temperature of the gas under test is brought to that of the room by allowing the gas to remain in a tank until it acquires the room-temperature. The waste products of combustion are allowed to escape from the absorption-chamber at a temperature equal to that of the room. Consequently the only heat given to the water passing through the absorption-chamber is the heat due to the combustion of the gas. The temperature of the waste gases is controlled by varying the amount of exposed cooling-surfaces of the absorption-chamber. Therefore as the gas in the tank is maintained under a constant pressure and the water from the absorption-chamber passes into the tank with a speed equal to that of the gas flowing out and to the Bunsen burner there is afforded a means for accurately determining the calorific value of the gas without making corrections for difference in temperature of the gas before and after combustion; nor is it necessary to make corrections due to difference in temperature of both the air required to support combustion and the products of combustion. Under the conditions that water is flowing into the tank as fast as the gas is flowing out and the gas is flowing to the Bunsen burner through a constant orifice and under constant pressure it is required that water should pass through the absorption-chamber at a constant rate, which reduces to zero any error that might occur due to the absorption-chamber having a high thermal capacity on account of its own mass and the mass of water it contains, provided the temperature of the water at intake remains constant, which is the usual condition in practice.

The invention consists of a gas-calorimeter for carrying out the above objects embodying the features of construction, combinations of elements, and arrangement of parts having the general mode of operation substantially as hereinafter fully described and claimed in this specification and shown in the accompanying drawings, in which—

Figure 46:
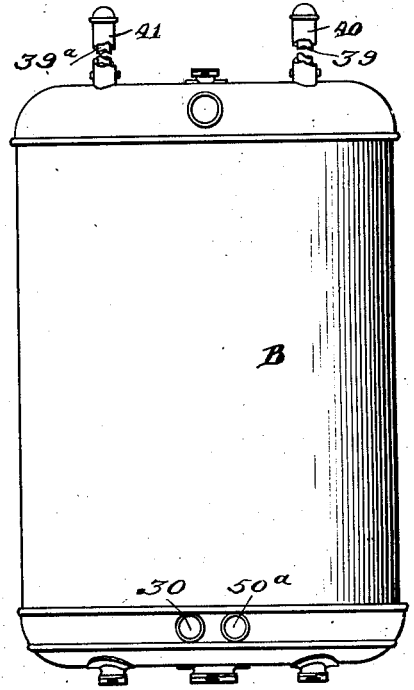
Figure 45:
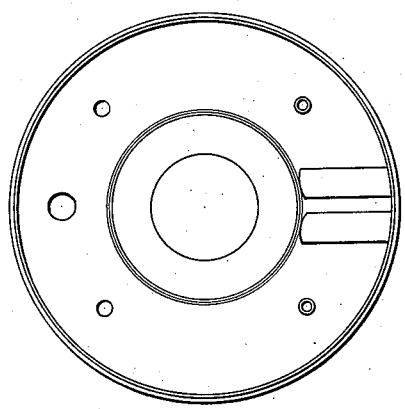
Figure 47:
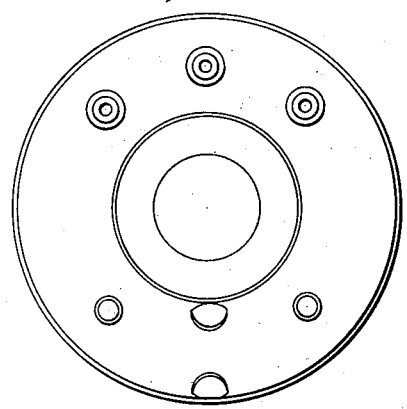
Figure 48:
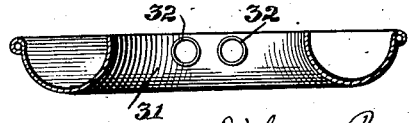
Figure 62:
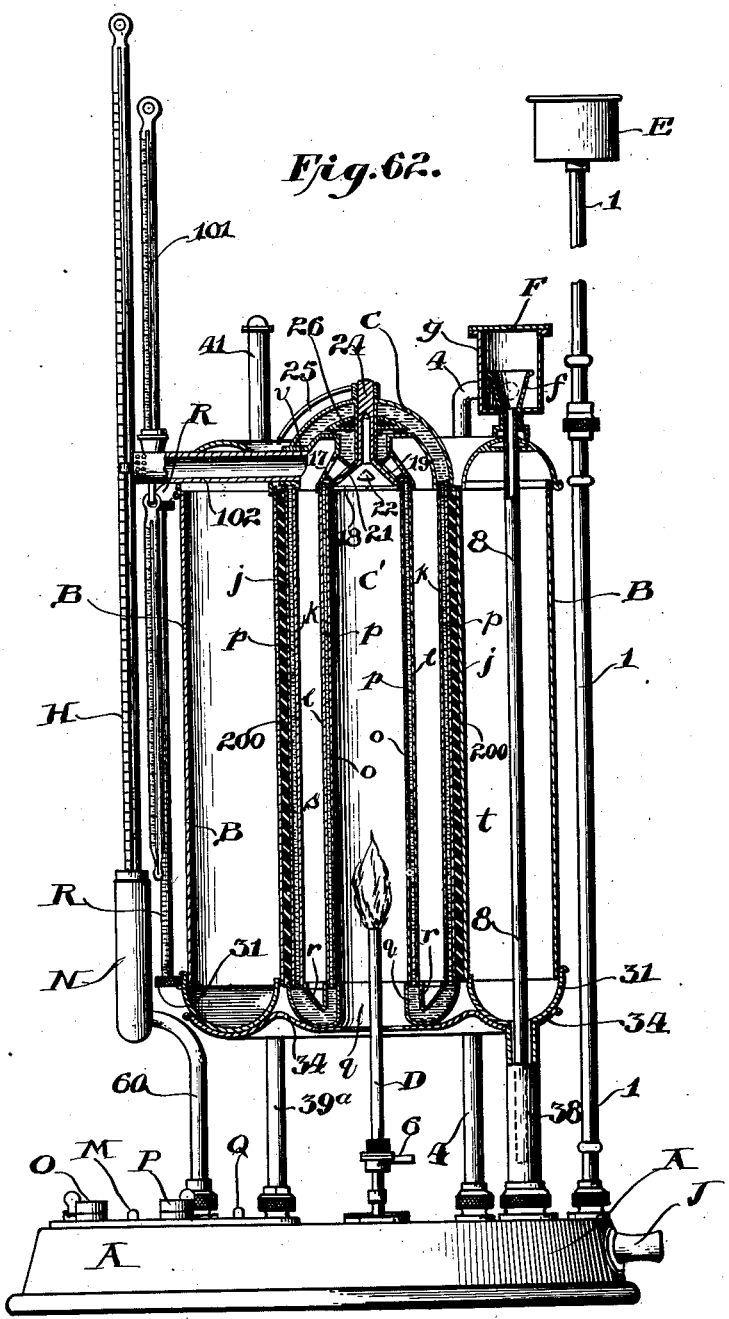

Figure 1 is a front elevation of the calorimeter. Fig. 2 is a side elevation. Fig. 3 is a plan view. Fig. 4 is a bottom plan view. Fig. 5 is a transverse sectional view on line x x of Fig. 4. Fig. 6 is a vertical sectional elevation of the absorption-chamber on line x x of Fig. 7. Fig. 7 is a top plan view of the same with the outside cover removed. Fig. 8 is an outside elevation of the absorption-chamber. Fig. 9 is a top plan view of Fig. 8. Fig. 10 is an elevation, partly in section and partly broken away, to show the baffle-plates in the absorption-chamber. Fig. 11 is a sectional side view, and Fig. 12 is a top plan view, of the outside cover of the absorption-chamber. Fig. 13 is a sectional side view, and Fig. 14 is a top plan view, of the inside cover of the absorption-chamber. Fig. 15 is a sectional side elevation, and Fig. 16 is a top plan view, of the outer conical cap of the absorption-chamber. Fig. 17 is a sectional side elevation, and Fig. 18 is a top plan view, of the inner conical cap of the absorption-chamber. Fig. 19 is a sectional side elevation, and Fig. 20 is a top plan view, of the conical gate of the absorption-chamber. Fig. 21 is a sectional side elevation, and Fig. 22 is a top plan view, and Fig. 23 is a bottom plan view, of the mixing-chamber of the absorption-chamber. Fig. 24 is a sectional side view, and Fig. 25 is a top plan view, and Fig. 26 is an outside elevation, of the outside base of the absorption-chamber. Fig. 27 is a sectional side view, Fig. 28 is a top plan view, and Fig. 29 is an outside elevation, of the inside base of the absorption-chamber. Fig. 30 is a sectional side elevation of the water-regulator, and Fig. 31 is a sectional side elevation of the siphon-brake. Fig. 32 is a sectional side elevation, and Fig. 33 is a top plan view, of the outer cup for the regulator. Fig. 34 is a sectional side elevation, and Fig. 35 is a top plan view, of the cone for the regulator. Fig. 36 is a sectional side elevation, and Fig. 37 is a top plan view, of the inside cup for the regulator. Fig. 38 is a sectional side view, and Fig. 39 is a plan view, of the cup base-plate for the regulator. Fig. 40 is a sectional side view, and Fig. 41 is a top plan view, of the cup for the siphon-brake. Fig. 42 is a sectional side elevation, and Fig. 43 is a top plan view, of the cone for the siphon-brake. Fig. 44 is a sectional side elevation of the tank, and Fig. 45 is a top plan view of the same with the cover removed. Fig. 46 is an outside elevation of the tank, and Fig. 47 is a top plan view of the same. Fig. 48 is a sectional side view of the tank-bottom, and Fig. 49 is a plan view. Fig. 50 is a sectional side view of the tank-base, and Fig. 51 is a plan view. Fig. 52 is a sectional side view of the tank-top, and Fig. 53 is a plan view. Fig. 54 is a sectional side view of the sheet-metal base of the calorimeter, and Fig. 55 is a plan view of the same. Fig. 56 is a plan view of the graduated plate for indicating the positions of the valves. Fig. 57 is a sectional side elevation, and Fig. 58 is an outside elevation, of the Bunsen burner. Figs. 59 and 60 are outside elevational views of the thermometer-chambers, and Fig. 61 is a sectional elevation of one of said chambers. Fig. 62 is a side elevation, partly in section, through the calorimeter on the line 10 10 of Fig. 3.

Referring to the drawings, A represents the base of the calorimeter which supports the tank B, the absorption-chamber C in this instance arranged concentrically within the tank, although any suitable arrangement may be provided, the Bunsen burner D, the water-pressure regulator E, the siphon-brake F, the water-inlet thermometer G, the water-outlet thermometer H, the pressure-gage I, and the necessary piping, valves, and thermometers for carrying out the functions of the apparatus.

J is the water-inlet pipe, which may be connected to any suitable source for supplying water circulation to the calorimeter.

K is the gas-inlet for supplying gas to the apparatus, and L is the outlet or drain-pipe for letting the water out of the apparatus.

Connection is made for water from inlet J to the joint with pipe 1 in the base of the calorimeter, Fig. 4, thence up by pipe 1 to the regulator E and down by pipe 2 to the joint in the base connecting with the drain L. Water from the regulator also passes down through pipe 3 to the joint with pipe $3^a$ in the base, thence by pipe $3^a$ in said base to the joint connecting with pipe 50, which pipe extends up to the casing N' of the inlet-pipe thermometer G. Water rises up through the passage 49, Fig. 60, of the thermometer-chamber and down around the inlet-thermometer G, and into the absorption-chamber C through pipe $50^a$, Fig. 2, which passes directly through tank B without communicating therewith and enters chamber C at the point marked $50^a$ in Fig. 8. The water circulates through the absorption-chamber C and passes from the mixing-chamber 26 in the top of the same containing metal shavings, down through a pipe 61 in the baffle-plate chambers, (seen in Fig. 7,) through opening 30, Fig. 8, and from thence by pipe $30^a$ to the outlet-thermometer chamber N, up around the thermometer and out by pipe 60 to the joint in the base, by pipe $60^a$ to valve M, by pipe $60^b$ to a joint in the base, up straight through the tank B without communicating therewith, by pipe 4 to siphon-brake F, out of brake by pipe 5, and down through tank B without communicating therewith, by said pipe 5 to a joint in the base and by pipe $5^a$ to drain L. Water also passes from the siphon-brake F by pipe 8, down through tank B, and empties into the large pipe 38. Pipe 38 communicates with the bottom of tank B, so that water rises up into the tank to fill it. Pipe 38 also connects with a joint in the base, from which pipe $38^a$ leads to valve Q, and thence pipe $38^b$ leads to drain L. By closing valve Q water rises in tank B.

Gas enters at K and passes by pipe K' in the base to valve P, thence by pipe $K^2$ to a joint in the base connecting with pipe 39, extending up into the hood 40, said pipe passing up through the tank B and serving to supply gas thereto above the water-level. Gas escapes from tank B by hood 41 and pipe $39^a$ therein, down through said pipe to the base, thence by pipe $41^a$ in the base to valve O, thence by pipe $41^b$ to gas-nipple 7, and then to the bunsen D.

In the base the pipe 44ª leading to drain is arranged to be directly under a suitable drip-pan (not shown) to be placed under pipe 44, leading from the tank.

Thermometer 100 measures the room temperature and thermometer 101 measures the temperature of the escaping products of combustion through pipe 102, having a perforated end, Fig. 3.

As described, the pipe 3, which connects the regulator with the absorption-chamber C and the tank B, is controlled by the valve M, marked "Reg. to tank." By opening valve M the cold supply-water may flow from regulator E first through the absorption-chamber C, thence through the outlet-thermometer chamber N and into the tank B, thus expelling the air in the tank through the Bunsen burner D as the water-level rises, which level is determined by the water-glass gage R. The valve O, marked "Tank to bunsen," is opened to permit the air from the tank B to escape through the Bunsen burner D. After all the air has been expelled from the tank B and the water fills the tank the valves M and O are closed. The valve P, marked "Gas to tank," is then opened to establish communication between the gas-supply at the pipe K and the tank B, and the valve Q, marked "Tank to drain," is opened to permit the water to drain off through the outlet L as the gas fills the tank. After the tank has been filled with gas to replace the water the valves P and Q are closed, and the apparatus is ready for starting a test. At this stage in the operations the water is continuously running through the absorption-chamber C and up pipe 4 to the siphon-brake F and from thence down through the U-shaped pipe 5 to the drain L, pipe 5 passing down through the tank B.

The tank B having been filled with gas, the test may be conducted by lighting the Bunsen burner D, which is supplied with gas by suitable hose connection (not shown) connecting the nipple 6 of the Bunsen burner with the nipple 7 on the base of the apparatus which is supplied with gas from the tank B by the piping within the apparatus.

By suitably adjusting the valves M, marked "Reg. to tank," and O, marked "Tank to bunsen," the circulation of water may be caused to pass from the absorption-chamber into the tank, while the gas in the tank is permitted to flow to the Bunsen burner. The proportional openings of these two valves M and O may be so adjusted that a constant pressure of gas may be maintained in the tank B, which will be indicated by the U-gage I. After these constant conditions are established—that is, when water is flowing through the absorption-chamber C and into the tank B with the same speed that gas is flowing out of the tank B—the differential reading between the water-inlet thermometer G and the water-outlet thermometer H, multiplied by a constant, which for practical purposes may be considered about 62.4, will give the calorific value of the gas in British thermal units, which is the result sought.

In Fig. 30 a detail sectional elevation of the water-pressure regulator is shown, and in Figs. 32 to 39 details of the regulator are shown. The regulator comprises the outer cup $a$, the perforated cone $b$, the inside cup $c$, and the cup-base $d$, having perforations for the pipes. The water rises in pipe 1 and enters the central cone $b$ through the holes $e$ and is allowed to flow in excess of the amount of water required. The excess water flows over the top of the cone $b$ into the outer chamber formed by the outer cup $a$ and passes to the drain L through pipe 2. The water passes to the absorption-chamber C and the tank B through the central pipe 3. It will be seen that according to the construction of this regulator E a constant pressure of water is maintained in pipe 3.

In Fig. 31 a detail sectional elevation is shown of the siphon-brake F, while Figs. 40 to 43 are details of the siphon-brake. The siphon-brake comprises the cone $f$ and the cup $g$. The cone $f$ of the siphon-brake is connected to the tank B by means of the piping 8 and water enters the siphon-brake by pipe 4 through aperture $h$ and may leave the siphon-brake through the U-shaped pipe 5, connected to the aperture $i$ on the brake. When the water cannot flow into the tank down through pipe 8, the water-level rises in the outer chamber in the siphon-brake and flows over into the U-shaped pipe 5, which, as stated, passes down through the tank B and is connected to the drain L. It will therefore be seen that by means of the siphon-brake F the pressure in the tank B cannot be increased beyond that equal to a few inches of water-pressure; but the flow of water may continue through the absorption-chamber C and pass to the drain L, thereby preventing any overheating of the water in the absorption-chamber, which might result in an explosion if the Bunsen burner were left burning and the flow of water through the absorption-chamber C was obstructed.

Regulating means are provided in connection with the absorption-chamber C for controlling the temperature of the flue-gases passing out from the calorimeter. By this means the temperature of the escaping flue-gases may be brought to the room temperature so that no heat is given to or taken from the air, and the only heat absorbed by the water in the combustion-chamber is furnished by the heat liberated from the combustion of the gases.

The construction of the absorption-chamber C and regulating means is shown in assembled view in Fig. 6 and in separate detail views in Figs. 11 to 29. The absorption-chamber comprises the four concentric cylindrical shells $j$ $k$ $l$ $o$, between which there is left a space $p$ for circulation of water. The absorption-chamber is provided with an outside base $q$, having suitable apertures for controlling the chamber, and an inside base $r$, coöperating with the outer base.

The absorption-chamber C is constructed in such manner that the temperature of the gases may be controlled, and according to this invention baffle-plates are provided and between which the gases of combustion may be conducted. The gases are conducted around and between a greater or lesser number of the baffle-plates before they are permitted to escape from the absorption-chamber, according to the temperature at which it is desired they shall leave the chamber. In the plan view in Fig. 7 and sectional elevation in Fig. 10 the baffle-plates $s$ extend from the bottom to within about one inch of the top of the absorption-chamber within the gas-space between the inner and outer shells of the absorption-chamber. The baffle-plates $t$ extend from the top of the absorption-chamber downward, and they are in length as illustrated in Fig. 10 in order that when the products of combustion are turned into the different channels formed by the baffle-plates the exposed absorbing-surface afforded by the baffle-plates may be varied. By this means the operator may expel the flue-gases at any particular temperature. Between the baffle-plates $s'$ and $t'$ there is a space $u$, which may be termed a "dead space," in order that no heat from baffle-plate $s'$ may be transmitted to baffle-plate $t'$ and thereby raise the temperature of the outgoing products of combustion. Both baffle-plates $s'$ and $t'$ extend the entire vertical length of the absorption-chamber.

Suitable means are provided for directing the gases from the combustion-chamber C' to and around the baffle-plates. The top of the absorption-chamber is provided with an outside cover 10, having an aperture 11 in its side and an aperture 12 in its top. There is an inside cover for the chamber, (indicated by the numeral 13,) which inside cover has an opening 14 in its top and an opening 15 in its side. The absorption-chamber is provided with an outer conical cap 16, open at top and bottom and having apertures 17 in the conical sides. Within the outer conical cap 16 is an inner conical cap 18, having apertures 19 in its sides and an upwardly-extending tube or throat 20. Within the inner conical cap is a conical gate 21, having a single aperture 22 in its conical side and provided with a tubular throat 23, which extends upwardly within the tubular throat 20 of the inner conical cap 18. The upper end of the throat 23 of the gate 21 is closed by a plug 24, and an arm 25 may be connected to said throat 23 on the outside of the absorption-chamber, by means of which the gate 21 may be rotated. According to this construction it will be seen that the products of combustion passing from the combustion-chamber C' in the absorption-chamber may be directed through the passages in which are arranged the baffle-plates, and according to the position of the gate 21 the products of combustion will be forced to pass over and around a greater or less number of the baffle-plates before said gases may escape from the absorption-chamber through the outlet $v$.

Within the top of the absorption-chamber is arranged a mixing-chamber 26, having perforations 27 in its convex top and being provided with two perforations 28 and 29 in its flat bottom. It will be seen that the water-passages between the concentric walls of the absorption-chamber extend up to the top of the chamber, and the water may find its way into the mixing-chamber 26 through the perforations 27. A pipe connection is made from the mixing-chamber to the opening 30, Fig. 8, and from thence suitable connection is made to the outlet thermometer-chamber N, so that the hot water passes directly from the top of the absorption-chamber to the outlet thermometer-chamber, where its temperature is taken. The loss of heat from this pipe is substantially zero, so that no practical error is introduced in the result obtained. The mixing-chamber 26 is preferably filled with metal shavings in order to thoroughly mix and commingle the water before leaving the absorption-chamber, so that it may not have a fluctuating temperature.

The tank is shown in Fig. 44, and details of the tank are shown in Figs. 48 to 53. The tank is formed of concentric cylinders $w$ and $x$ and is provided with a tank-bottom 31, having apertures 32 in the sides, through which tubing 33 extends. The bottom of the tank 31 is also suitably perforated for the piping of the calorimeter. The tank is provided with a base 34, which fits over the tank-bottom 31 and is suitably perforated to coöperate with the tank-bottom. The tank-top 35 is provided with an aperture 36 in its side, through which a tube 37 extends, and suitable perforations are also provided for the piping of the calorimeter.

A pipe 8, as stated, leads from the central cone $f$ of the siphon-brake down through the tank B and opens into the lower part of pipe 38, Fig. 2. By this means the water from the absorption-chamber C may enter the tank B without disturbing the surface of the water in the tank. Gas from the gas-main enters the tank B through the valve P, marked "Gas to tank" and passes up pipe 39, which pipe extends vertically up through the tank B and discharges into the hood 40. Gas passes from the tank B to the Bunsen burner D by means of the hood 41 and down through pipe 42 through the valve O marked "Tank to Bunsen" and from thence is burned at the Bunsen burner.

According to the construction of this gas-calorimeter, it will be seen that the water-level in the tank B can only rise up to the top of the cone $f$ in the siphon-brake F. All the outlets, with the exception of the "Tank to drain," are placed above the level of the cone $f$ and are thus protected from being filled with water.

According to the operation of this calorimeter the tank is filled with gas. The gas is burned and heats water that afterward flows back to the tank and displaces the exact amount of gas that has been withdrawn. In other words, it is a volumetric displacement, volume for volume. The differential temperature of the water before and after entering the absorption-chamber, multiplied by the coefficient of thermal capacity of a cubic foot of water, which is practically 62.4, gives the calorific value of a cubic foot of gas. There is therefore no necessity for measuring the gas by a meter, because the calorimeter operates upon a displacement basis, and if there are substantially no leaks and the pressure of the gas is maintained constant during the test practically all possible errors are eliminated. There is, furthermore, no set time required in which to run the test. When constant conditions are established, the result is instantly given by multiplying the differential temperature by the constant 62.4.

One of the important features of this invention resides in the fact that the flue-gases as they leave the absorption-chamber may be brought to the same temperature at which they entered, and therefore no calculation or correction need be applied.

The absorption-chamber arranged concentrically with the tank may be separated therefrom, if desired, by means of a heavy layer of felt 200, Fig. 62, in order that the tank may be insulated as completely as possible from a thermal standpoint. The absorption-chamber comprises, as described, two concentric boilers which make it possible to have a low thermal capacity for the chamber, while at the same time all the flue-gases are always in contact with the water-cooled surface and are arranged to give up all their heat to the water, thus eliminating, as far as possible, errors in this regard.

The tank cannot be overflowed with water and the water may circulate continuously through the absorption-chamber in consequence of the construction of the siphon-brake. Furthermore, no higher pressure can be placed on the tank than the difference between the water-level in the tank and the top of the cone in the siphon-brake.

A sample of gas may be taken very slowly into the tank by fully opening the valve marked "Gas to tank" and opening very slightly the valve marked "Tank to drain." This is an advantage, as it enables the operator to obtain an average sample extending over from twelve to twenty-four hours, which will give an average sample of gas produced during that time.

The construction of the apparatus is such that all four thermometers may be placed very close together, and especially the inlet and outlet thermometers, which enables the reader to actually determine the differential temperature. There are no parts about the calorimeter that are calibrated or can get out of calibration, except the thermometers, and this is an important feature, because calorimeters which require a gas-meter are not accurate, since the meter is seldom accurate itself and does not stay in calibration for any extended length of time.

In the construction and operation of the inlet thermometer-chamber the water first passes up on the outside, then down into contact with the thermometer-bulb, and immediately into the absorption-chamber. The instantaneous temperature is thus given before the water enters the absorption-chamber. In the outlet thermometer-chamber, the water first strikes the bulb of the thermometer, then passes up and down on the outside, thereby giving the instantaneous temperature as the water comes directly from the absorption-chamber.

The water of condensation collects in the bottom of the absorption-chamber and drains into the tube 43, Fig. 8, which tube is connected with the S-shaped tube 44, Fig. 1. In case it is desired to measure the water of condensation, a graduated beaker is placed beneath the tube 44. When the graduated beaker is not in position, the water of condensation may be dripped into a small pan placed on the base of the calorimeter, which pan may be connected by a small pipe to the drain. With regard to the water of condensation two marks are preferably placed on the gage-glass R in Fig. 1, which indicate a certain volumetric content of the tank. Therefore to determine the water of condensation the graduated beaker is inserted beneath the drip as the water-level in the tank reaches the lower mark on the gage, and it is not withdrawn until the water-level reaches the top mark on the gage. Assume, for instance, that the two marks on the gage-glass R indicate one-half of a cubic foot. Then the amount of water of condensation multiplied by the volumetric displacement of gas, which is the fraction one-half of a cubic foot, would give the condensation per cubic foot of gas. It has been found that under the given conditions the constant which should be used for multiplication is the reciprocal of one-half, or the constant "2."

Obviously some features of this invention may be used without others, and the invention may be embodied in widely-varying forms.

Therefore without limiting the invention to the constructions shown and described nor enumerating equivalents, I claim, and desire to obtain by Letters Patent, the following:

1. In a calorimeter, the combination of a tank, means for burning gas, means for conducting gas from the tank to the point to be burned, means for heating water, means for displacing the gas in the tank volume for volume, with water heated by the combustion of the gas, and means for measuring the rise in temperature of the water.

2. In a calorimeter, the combination of a tank for holding a predetermined quantity of gas, means for burning the gas, means for conducting the gas from the tank to the point to be burned, means for heating water with the products of combustion, and means for displacing the gas in the tank by the water heated volume for volume, as the gas is burned.

3. In a calorimeter, the combination of an absorption-chamber and a tank, means for burning gas, means for conducting gas from the tank to the point to be burned, means for continuously flowing water through said absorption-chamber, means for displacing the gas in the tank volume for volume, with water heated in the absorption-chamber by the combustion of the gas, and means for measuring the temperature of the water as it enters and leaves the absorption-chamber.

4. In a calorimeter, the combination with a tank, of means for burning gas, means for conducting gas from the tank to the point to be burned, means for heating water, means for displacing the gas in the tank volume for volume, with water heated by the combustion of the gas, means for measuring the rise in temperature of the water, and means for controlling the temperature of the waste products of combustion.

5. In a calorimeter, the combination of an absorption-chamber provided with effective cooling-surfaces, and a tank, of means for burning gas, means for heating water, means for continuously flowing water through said chamber, means for displacing the gas in the tank volume for volume, with water heated by the combustion of the gas, means for measuring the temperature of the water as it enters and leaves the absorption-chamber, and means for varying the effective cooling-surfaces of the absorption-chamber to control the temperature of the waste gases.

6. In a calorimeter, the combination of a tank for gas and water, means for burning the gas, means for supplying gas from the tank to the burner, means for heating the water by the combustion of the gas, means for conducting the heated water to the tank, and thereby displacing the gas in the tank, volume for volume, with the water heated by the combustion of the gas, and means for measuring the rise in temperature of the water.

7. In a calorimeter, the combination of a tank for holding a predetermined quantity of gas, means for burning the gas, means for conducting the gas from the tank to the burner, means for supplying water, means for heating the water with the products of combustion, means for leading the heated water to the tank, and thereby displacing the gas in the tank by the water heated volume for volume, as the gas is burned.

8. In a calorimeter, the combination of an absorption-chamber and a tank, means for burning gas, means for conducting the gas from the tank to the burner, means for continuously flowing water through said absorption-chamber, means for leading the water to the tank, and thereby displacing the gas in the tank volume for volume, with water heated in the absorption-chamber by the combustion of the gas, and means for measuring the temperature of the water as it enters and leaves the absorption-chamber.

9. In a calorimeter, the combination with a tank, of means for burning gas, means for conducting the gas from the tank to the burner, means for supplying water, means for heating the water by the combustion of the gas, means for leading the water to the tank, and thereby displacing the gas in the tank volume for volume, with water heated by the combustion of the gas, means for measuring the rise in temperature of the water, and means for controlling the temperature of the waste products of combustion.

10. In a calorimeter, the combination of an absorption-chamber provided with effective cooling-surfaces, a tank, means for burning gas, means for conducting the gas from the tank to the burner, means for supplying water, means for heating the water by the combustion of the gas, means for continuously flowing water through said chamber, means for leading the water to the tank, and thereby displacing the gas in the tank volume for volume, with the water heated by the combustion of the gas, means for measuring the temperature of the water as it enters and leaves the absorption-chamber, and means for varying the effective cooling-surfaces of the absorption-chamber to control the temperature of the waste gases.

11. In a calorimeter, the combination of a tank for gas and water, means for burning the gas, means for conducting the gas from the tank to the burner, means for supplying water, means for heating the water by the combustion of the gas, means for displacing the gas in the tank volume for volume, with the heated water, means for measuring the rise in temperature of the water and a pressure-regulator for regulating the pressure of the water.

12. In a calorimeter, the combination of a tank, means for burning gas, means for conducting gas from the tank to the point to be burned, means for heating water by the combustion of the gas, means for displacing the gas in the tank volume for volume, with water heated by the combustion of the gas, means for measuring the rise in temperature of the water, means for maintaining a constant pressure of water, and means for preventing the increase of pressure in the tank beyond a predetermined amount.

13. In a calorimeter, the combination of a tank, means for burning gas, means for conducting gas from the tank to the point to be burned, means for heating water by the combustion of the gas, means for displacing the gas in the tank volume for volume, with water heated by the combustion of the gas, means for measuring the rise in temperature of the water, and means for controlling the temperature of the waste products of combustion whereby they may be expelled from the calorimeter at any desired temperature.

14. In a calorimeter, the combination of a tank, means for burning gas, means for conducting gas from the tank to the point to be burned, means for heating water by the combustion of the gas, means for displacing the gas in the tank, volume for volume, with water heated by the combustion of the gas, means for measuring the rise in temperature of the water, and means for bringing the flue-gases as they leave the apparatus to substantially the same temperature at which the gas enters the apparatus.

15. In a calorimeter, the combination of a tank and an absorption-chamber, means for burning gas, means for conducting gas from the tank to the point to be burned, means for heating water by the combustion of the gas, means for displacing the gas in the tank volume for volume, with water heated by the combustion of the gas, means for measuring the rise in temperature of the water, means for controlling the temperature of the waste products of combustion, means for regulating the pressure of the water, and additional means for regulating the pressure in the tank.

16. In a calorimeter, the combination with a tank, means for burning gas, means for conducting the gas from the tank to the point to be burned, and means for heating water by the combustion of the gas, of means for displacing the gas in the tank volume for volume, with water heated by the combustion of the gas.

17. In a calorimeter, the combination of means for burning gas, means for supplying water, means for measuring the rise in temperature of the water, cooling-surfaces for controlling the final temperature of the waste products of combustion, and means for varying the effective amount of said cooling-surfaces whereby the products of combustion may be expelled from the calorimeter at any desired temperature.

In testimony whereof I have signed this specification in the presence of two subscribing witnesses.

HENRY L. DOHERTY.

Witnesses:
HELEN L. OBERTEUFFER,
H. E. OGDEN, Jr.